May 29, 1951 — E. R. GIBSON — 2,554,735
RESILIENT GANG HOOK FOR FISHING LURES
Filed Feb. 13, 1948
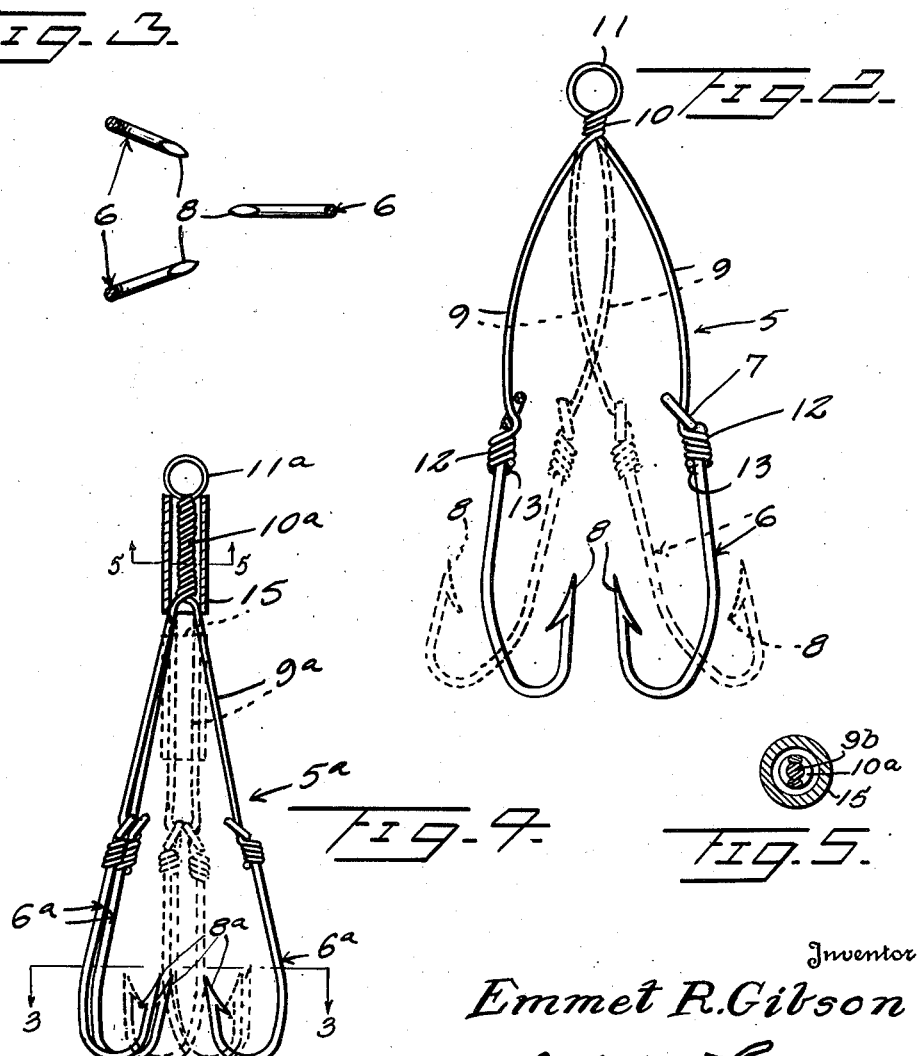
Inventor
Emmet R. Gibson
By John N. Randolph
Atty.

Patented May 29, 1951

2,554,735

UNITED STATES PATENT OFFICE 2,554,735

RESILIENT GANG HOOK FOR FISHING LURES

Emmet R. Gibson, Yuma, Ariz.

Application February 13, 1948, Serial No. 8,157

1 Claim. (Cl. 43—36)

This invention relates to an improved construction of resilient or active gang hook adapted for use with various types of lures, particularly artificial lures and more particularly aims to provide a gang hook adapted to function as a "grabber" yet which is substantially weedless and normally disposed so that the points and barbs of the hooks are not exposed but are located in protected position until the gang hook is activated by being engaged in the mouth of a fish causing the barbed ends of the hooks to be projected into operative positions.

Another object of the invention is to provide a resilient gang hook of extremely simple construction capable of being manufactured in various sizes and having any desired number of hooks and which is adapted to be applied to any lure and will function in conjunction therewith without relying upon any part of said lure for its operation.

Another object of the invention is to provide a multiple lure which while being extremely resilient so as to be readily activated by engagement of a fish therewith, yet which through its unique construction will withstand considerable pull without having the hooks thereof straightened out thereby.

A further object of the invention is to provide a multiple resilient hook having means for holding the hooks thereof projected for disgorging the hooks from the mouth of a fish or for utilization of the gang hook with the hooks projected as where fishing in weedless waters.

Numerous other objects and advantages of the invention will hereinafter become more fully apparent from the following description of the drawing, illustrating preferred embodiments of the invention, and wherein:

Figure 1 is a side elevational view showing the resilient gang hook attached to one form of lure;

Figure 2 is an enlarged side elevational view of the gang hook;

Figure 3 is a cross sectional view thereof, taken substantially along a plane as indicated by the line 3—3 of Figure 4, Figure 4 is a view similar to Figure 3 but illustrating a slightly modified form of the invention, Figure 5 is an enlarged horizontal sectional view of a portion of the resilient gang hook taken substantially along a plane as indicated by the line 5—5 of Figure 4.

Referring more specifically to the drawing and first with reference to the embodiment of the resilient gang hook as illustrated in Figures 1, 2 and 3, said gang hook designated generally 5 and comprising the invention is illustrated as including three conventional fish hooks, each designated generally 6 which are provided with relatively short shanks terminating in eyes 7 and which are bent at the opposite ends of said shanks to provide the pointed barbed ends 8.

The shanks of the hooks 6 constitute substantially rigid shank portions of the gang hook 5 which also includes the resilient shank portions 9 which are preferably formed from two strands of resilient wire which are twisted together to provide a twisted shank 10, remote to the hook 6 and an eye 11, formed by a portion of one of said strands and which is disposed beyond said twisted shank 10. The three strand ends which project from the inner end of the twisted shank 10 are bowed outwardly relatively to one another and each of said strand ends or shanks 9 extends through a shank eye 7 and is secured to the shank of the hook thereof adjacent said eye by being twisted or wound around as seen at 12. The twisted or wound portions 12 may also be permanently anchored to the hook shanks as by welding, as seen at 13.

The gang hook 5 has been illustrated as including three fish hooks 6 and accordingly three resilient shanks 9 so that one end of one of the strands forming said shanks 9 will terminate in the twisted shank 10. However, it will be readily apparent that the gang hook 5 could be composed of two hooks 6 in which case only a single strand would be required to provide the two resilient shank portions 9 or said gang hook could employ four or more fish hooks 6 and a corresponding number of resilient shanks 9.

It will be readily apparent that the eye 11 may be attached in any conventional manner to any type of fishing lure and in any desired location with respect thereto, including such artificial lures as plugs, bugs, streamers, flies, pork rinds, spoons and spinners, and is shown in Figure 1 merely for the purpose of illustration, attached to the trailing end of an artificial spinner lure 14.

In its normal position, the gang hook 5 will be disposed as illustrated in Figures 1 and 3 and in full lines in Figure 2 so that the barbed and pointed ends 8 of the hooks 6 will be positioned inwardly of the shanks of said hooks to be protected thereby and by the resilient shanks 9 as the gang hook 5 is drawn through the water to prevent the barbed end 8 from becoming fouled by weeds, thus rendering the gang hook weedless. When the gang hook 5 is grabbed by the fish the pressure of the fish's mouth on the non resilient and resilient shank portions of the gang hook will cause the barbed ends 8 to be projected to their dotted line positions of Figure 2 and so that said pointed barbed ends will be exposed for snaring in the fish's mouth. It will be readily obvious that the right-hand hook 6 of Figure 3 will pass between the two left-hand hooks 6 of said figure when the hook 5 is thus moved to an active position with its barbed ends 8 exposed and it will also be apparent that the resiliency of the gang hook 5 permitting said barbed ends 8 to move to project position will be afforded entirely by the resilient shank portions 9 and accordingly the shanks of the hooks 6 and their bent portions can be sufficiently rigid to withstand any desired pull without danger of having the hooks straightened out.

It will also be noted that the gang hook 5 need not necessarily be welded as seen at 13 and also that the weld 13 will not effect the resiliency of the shank portions 9 since said welds are located sufficiently remote thereto so that the resilient shank portions 9 will not be injured or their resiliency affected by the heat incident to the welding operation.

Figure 4 illustrates a slightly modified form of the gang hook, designated generally 5a and which differs from the gang hook 5 only in that the shank portions 9a thereof instead of being bowed outwardly are shown as being substantially straight and disposed in diverging relationship from the twisted shank 10a toward the fishhooks 6a. The gang hook 5a also carries a sleeve 15 which is normally disposed on the twisted shank 10a between the resilient shank portion 9a and the eye 11a. It will be readily apparent that the sleeve 15 can be slid downwardly on to the resilient shank portions 9a as illustrated in dotted lines in Figure 4 for holding the barbed ends 8a of the hook 6a in projected position if desired while fishing in weedless waters or for holding said hooks projected after a fish has been snared and while the individual hooks 6a are being disgorged from the fish's mouth. Figure 5 shows the opposite end 9b of the strand which terminates in the twisted shank 10a.

Various other modifications and changes are likewise contemplated and may obviously be resorted to, without departing from the spirit or scope of the invention as hereinafter defined by the appended claim.

I claim as my invention:

A gang hook comprising two strands of resilient wire, one of said strands being twisted upon itself to provide a twisted shank having a loop at one end, the terminals of said aforementioned strand projecting in diverging relationship to one another from the opposite end of said twisted shank to form a pair of resilient shanks, one end of said other resilient strand being anchored in said twisted shank and having its opposite end projecting from the last mentioned end of the twisted shank in outwardly diverging relationship to said pair of resilient shanks and forming a third resilient shank, a fishhook supported by each of said resilient shanks, each fishhook having a rigid shank rigidly secured to the terminal of one of said resilient shanks and forming an extension thereof, the fishhooks connected to the first pair of resilient shanks having pointed ends facing in the same general direction and generally toward the fishhook of the third resilient shank, the fishhook supported by said third resilient shank being located opposite the space between the fishhooks supported by said pair of resilient shanks and having a pointed end facing toward said space and positioned so that upon movement of the hooks toward the axis of the twisted shank the point of the fishhook secured to said third resilient shank will move between the shanks of the fishhooks secured to the pair of resilient shanks.

EMMET R. GIBSON.

REFERENCES CITED

The following references are of record in the file of this patent:

UNITED STATES PATENTS

| Number | Name | Date |
|---|---|---|
| 454,580 | Mack | June 23, 1891 |
| 720,449 | Little | Feb. 10, 1903 |
| 825,639 | Curtis | July 10, 1906 |
| 2,162,739 | Mindek, Jr. | June 20, 1939 |
| 2,357,357 | Premo | Sept. 5, 1944 |